(12) United States Patent
Chane et al.

(10) Patent No.: US 10,587,930 B2
(45) Date of Patent: *Mar. 10, 2020

(54) INTERACTIVE USER INTERFACE FOR TELEVISION APPLICATIONS

(71) Applicant: Comcast Cable Communications Management, LLC, Philadelphia, PA (US)

(72) Inventors: Lena D. Chane, San Francisco, CA (US); Matt Marenghi, San Anselmo, CA (US); Ty Ahmad-Taylor, New York, NY (US); Alex Chung, San Francisco, CA (US); Prakash Hegde, Mill Valley, CA (US); Samuel Moreau, Bellevue, WA (US); Darrell Haber, Martinez, CA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,375

(22) Filed: Oct. 15, 2018

(65) Prior Publication Data
US 2019/0158923 A1 May 23, 2019

Related U.S. Application Data

(60) Continuation of application No. 13/736,283, filed on Jan. 8, 2013, now Pat. No. 10,149,014, which is a (Continued)

(51) Int. Cl.
H04N 21/482 (2011.01)
H04N 5/445 (2011.01)
(Continued)

(52) U.S. Cl.
CPC ....... *H04N 21/482* (2013.01); *H04N 5/44543* (2013.01); *H04N 21/2355* (2013.01);
(Continued)

(58) Field of Classification Search
CPC .................................................... H04N 21/482
See application file for complete search history.

(56) References Cited

U.S. PATENT DOCUMENTS 5,287,489 A 2/1994 Nimmo et al.
5,321,750 A 6/1994 Nadan
(Continued)

FOREIGN PATENT DOCUMENTS

EP 0624039 A2 11/1994
EP 0963115 A1 12/1999
(Continued)

OTHER PUBLICATIONS

Fernando Pereira, "The MPEG-4 Book", Prentice Hall, Jul. 10, 2002.
(Continued)

*Primary Examiner* — Pankaj Kumar
*Assistant Examiner* — Charles N Hicks
(74) *Attorney, Agent, or Firm* — Banner & Witcoff, Ltd.

(57) ABSTRACT

An iTV user interface includes a navigable menu area through which a user can select from among a variety of services and a content display area in which formatted data associated with a selected menu service are displayed to the user. The formatted data is displayed in a rotating or ticker fashion having both a passive mode, in which the formatted data is displayed in a sequence independent of any selection operations by a television viewer, and active mode, in which the formatted data is displayed in a sequence that depends on selection operations by the television viewer. Advertisements and/or promotions may be interspersed among the
(Continued)

content items. The navigable menu area and the content display area may be displayed to the viewer at the same time as television programming is displayed on the television.

20 Claims, 10 Drawing Sheets

Related U.S. Application Data division of application No. 10/247,901, filed on Sep. 19, 2002, now Pat. No. 8,365,230.

(60) Provisional application No. 60/395,277, filed on Jul. 11, 2002, provisional application No. 60/323,658, filed on Sep. 19, 2001.

(51) Int. Cl.
　　*H04N 21/443*　　　(2011.01)
　　*H04N 21/472*　　　(2011.01)
　　*H04N 21/4786*　　(2011.01)
　　*H04N 21/4788*　　(2011.01)
　　*H04N 21/81*　　　(2011.01)
　　*H04N 21/8543*　　(2011.01)
　　*H04N 21/235*　　　(2011.01)
　　*H04N 21/2665*　　(2011.01)
　　*H04N 21/8545*　　(2011.01)
　　*H04N 5/45*　　　　(2011.01)
　　*H04N 21/478*　　　(2011.01)

(52) U.S. Cl.
　　CPC ..... *H04N 21/2665* (2013.01); *H04N 21/4437* (2013.01); *H04N 21/4438* (2013.01); *H04N 21/4786* (2013.01); *H04N 21/4788* (2013.01); *H04N 21/47202* (2013.01); *H04N 21/47214* (2013.01); *H04N 21/4828* (2013.01); *H04N 21/812* (2013.01); *H04N 21/8543* (2013.01); *H04N 21/8545* (2013.01); *H04N 5/45* (2013.01); *H04N 21/478* (2013.01)

(56) References Cited

U.S. PATENT DOCUMENTS

| | | |
|---|---|---|
| 5,353,121 A | 10/1994 | Young et al. |
| 5,485,221 A | 1/1996 | Banker et al. |
| 5,521,841 A | 5/1996 | Arman et al. |
| 5,530,939 A | 6/1996 | Mansfield, Jr. et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,904,610 B1 | 6/2005 | Bayrakeri et al. |
| 6,910,191 B2 | 6/2005 | Segerberg et al. |
| 6,918,131 B1 | 7/2005 | Rautila et al. |
| 6,963,880 B1 | 11/2005 | Pingte et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |

(56) References Cited

U.S. PATENT DOCUMENTS

| | | |
|---|---|---|
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 | 4/2013 | Kamimaeda et al. |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,363,560 B2 | 6/2016 | Moreau et al. |
| 9,473,548 B1 | 10/2016 | Chakrovorthy et al. |
| 9,516,253 B2 | 12/2016 | De Andrade et al. |
| 10,149,014 B2 * | 12/2018 | Chane ............... H04N 5/44543 |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslaysky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |

(56) References Cited

U.S. PATENT DOCUMENTS

| | | |
|---|---|---|
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0143191 A1 | 6/2006 | Cho et al. |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddaramappa et al. |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Roving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2012/0002111 A1 | 1/2012 | Sandoval et al. |
| 2012/0054811 A1 | 3/2012 | Spears |
| 2012/0117151 A1 | 5/2012 | Bill |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |

(56) References Cited

U.S. PATENT DOCUMENTS

| | | |
|---|---|---|
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0032473 A1 | 1/2014 | Enoki et al. |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0359662 A1 | 12/2014 | Packard et al. |
| 2014/0365302 A1 | 12/2014 | Walker |
| 2014/0373032 A1 | 12/2014 | Merry et al. |
| 2015/0026743 A1 | 1/2015 | Kim et al. |
| 2015/0263923 A1 | 9/2015 | Kruglick |

FOREIGN PATENT DOCUMENTS

| | | |
|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 2000011869 A1 | 3/2000 |
| WO | 0033576 A1 | 6/2000 |
| WO | 0110115 A1 | 2/2001 |
| WO | 0182613 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

Michael Adams, "Open Cable Architecture", Cisco Press, Dec. 3, 1999.
Andreas Kraft and Klaus Hofrichter, "An Approach for Script-Based Broadcast Application Production", Springer-Verlag Berlin Heidelberg, pp. 74-82, 1999.
Mark Riehl, "XML and Perl", Sams, Oct. 16, 2002.
MetaTV, Inc., PCT/US02/29917 filed Sep. 19, 2002, International Search Report dated Apr. 14, 2003; ISA/US; 6 pages.
Sylvain Devillers, "Bitstream Syntax Definition Language: an Input to MPEG-21 Content Representation", Mar. 2001, ISO, ISO/IEC JTC1/SC29/WG11 MPEG01/M7053.
Shim, et al., "A SMIL Based Graphical Interface for Interactive TV", Internet Tech. Laboratory Dept. of Comp. Engineering, San Jose State University, pp. 257-266, 2003.
Yoon, et al., "Video Gadget: MPET-7 Based Audio-Visual Content Indexing and Browsing Engine", LG Electronics Institute of Technology, 2001, pp. 59-68.
Watchwith webpage; http://www.watchwith.com/content_owners/watchwith_plalform_components.jsp (last visited Mar. 12, 2013).
Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).
"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).
European Patent Application No. 09175979.5—Office Action dated Dec. 13, 2011.
Canadian Patent Application No. 2,685,833—Office Action dated Jan. 20, 2012.
Li, Y. et al. "Reliable Video Clock Time Recognition", Pattern Recognition, 2006, 1CPR 1006, 18th International Conference on Pattern Recognition, 4 pages.
European Search Report dated Mar. 1, 2010.
Salton et al., Computer Evaluation of Indexing and Text Processing Journal of the Association for Computing Machinery, vol. 15, No. 1, Jan. 1968, pp. 8-36.
Smith, J.R. et al., An Image and Video Search Engine for the World-Wide Web Storage and Retrieval for Image and Video Databases 5, San Jose, Feb. 13-14, 1997, Proceedings of Spie, Belingham, Spie, US, vol. 3022, Feb. 13, 1997, pp. 84-95.
Kontothoanassis, Ledonias et al. "Design, Implementation, and Analysis of a Multimedia Indexing and Delivery Server", Technical Report Series, Aug. 1999, Cambridge Research Laboratory.
Messer, Alan et al., "SeeNSearch: A context Directed Search Facilitator for Home Entertainment Devices", Paper, Samsung Information Systems America Inc., San Jose, CA, 2008.
Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.
Changsheng Xu et al., "Using Webcast Text for Semantic Event Detection in Broadcast Sports Video", IEEE Transactions on Multimedia, vol. 10, No. 7, pp. 1342-1355, Nov. 2008.
Liang Bai et al., "Video Semantic Content Analysis based on Ontology", International Machine Vision and Image Processing Conference, pp. 117-124, Sep. 2007.
Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.
European Application No. 09 175 979.5—Office Action dated Apr. 11, 2011.
Boronat F et al: "Multimedia group and inter-stream synchronization techniques: A comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112A—dated May 11, 2015.
CA Response to Office Action—CA Appl. 2,685,833—Submitted Jul. 17, 2015.

(56) References Cited

OTHER PUBLICATIONS

Response to European Office Action—European Appl. 13192112.4—submitted Dec. 9, 2015.
CA Office Action—CA App 2,685,833—dated Jan. 27, 2016.
European Office Action—EP App 14159227.9—dated Jul. 12, 2016.
Agnieszka Zagozdzinnska et al. "Tridaq Systems in HEP Experiments at LHC Accelerator" Kwartalnik Elektroniki I Telekomunikacji, vol. 59, No. 4, Oct. 2013.
CA Office Action—CA Application 2685833—dated Feb. 8, 2017.
Nov. 29, 2017—Canadian Office Action—CA 2,685,833.
Feb. 19, 2018—European Summons to Oral Proceedings—EP 14159227.9.
Mar. 9, 2018—European Office Action—EP 13192112.4.
Jul. 31, 2018—European Decision to Refuse—14159227.9.
Sep. 5, 2019—Canadian Office Action—CA 2,685,833.
Nov. 6, 2019—Canadian Office Action—CA 2,832,800.

* cited by examiner

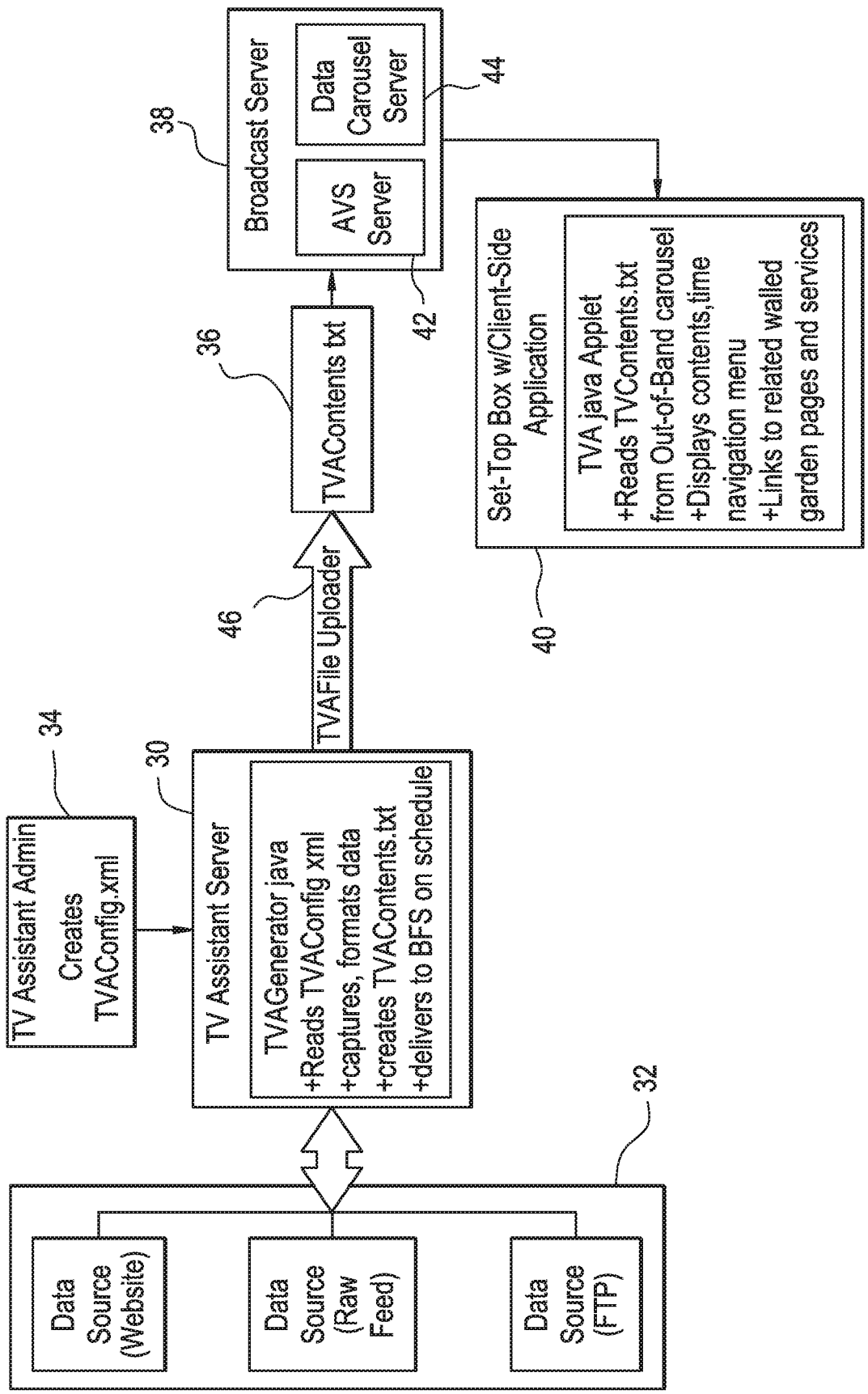

INTERACTIVE USER INTERFACE FOR TELEVISION APPLICATIONS

RELATED APPLICATIONS

This application is a continuation of and claims priority to U.S. application Ser. No. 13/736,283, filed Jan. 8, 2013, which is a divisional of and claims priority to U.S. application Ser. No. 10/247,901, filed Sep. 19, 2002, issued Jan. 29, 2013 as U.S. Pat. No. 8,365,230, which is a non-provisional of and claims priority to both U.S. provisional application No. 60/395,277, filed Jul. 11, 2002, and U.S. provisional application No. 60/323,658, filed Sep. 19, 2001. Each of the above-mentioned applications is incorporated herein by reference in its entirety.

FIELD OF THE INVENTION

The present invention relates to a user interface for use with video systems, and in particular interactive television (iTV) systems, that provides for both information display and navigation.

BACKGROUND

In the past few years, home entertainment has evolved from purely one-way radio and television (TV) broadcasts to include two-way communication that encompasses interactive games, video on demand (VOD), educational fare and consumer-oriented services (e.g., interactive shopping). For the most part, these services have been offered through familiar cable and satellite television distribution systems.

Broadly speaking, there are two paradigms for using cable and satellite systems in this fashion. One is computer-centric: using an installed satellite or cable feed (perhaps with a cable or telephone network back channel) as a high-bandwidth conduit to bring online computing services, such as Internet access, into the home. The second is television-centric: adding interactive functions to TV programming.

In general, systems deployed using the television-centric model have been grouped under the label interactive television or iTV. iTV services are usually delivered to subscribers' homes through an existing cable system, along with other, free and pay-for content. One example of available iTV services is a series of interactive TV portal screens, collectively called a "walled garden". A walled garden is a collection of user content targeted toward a specific viewing audience. Delivered to the television via a local decoder system (sometimes called a set-top box), viewers navigate the walled garden using a remote control, exploring and interacting with offerings such as banking services, news, sports, weather, entertainment, and shopping. Network operators typically gain revenue from walled gardens by taking a percentage of the transactions or charging for space in TV malls. Walled gardens extend the network operator's brand identity while maintaining the well-known names that provide the content. Thus, the service provider can create a cohesive set of up-to-date content to provide viewers with a rich interactive experience through their television set. These walled garden services can be enhanced through the provision of on-demand video services being made available related to the walled garden content. In this manner various special interest 'virtual' channels that include on-demand video services, such as home and garden, travel, history, geography, sports, educational and news channels can be made available to the home viewer.

As indicated above, accessing iTV services sometimes requires the installation of a special decoder system (a set-top box) that may include a dedicated remote control unit. Other systems incorporate the iTV decoder system in a set-top box that is also used to decode and/or decrypt the television signals. In either case, the set-top box and its associated remote control provide an interface for the user to access the iTV services, usually through some form of on-screen menu that is displayed in response to user command inputs. The on-screen menu may or may not be overlaid on top of the television picture. Common examples of on-screen menus include audio/video program guides, electronic catalogs, and advertising information.

Clearly, an important component of any walled garden or other iTV service is the interactivity provided through the combination of the set-top box and its remote control and the on-screen menu. Collectively, the set-top box, the remote control and the visual information display make up the user interface for the iTV services. To date, however, these user interfaces have not been satisfactory.

SUMMARY OF THE INVENTION

The present invention relates to user interfaces for interactive television (iTV) and other applications, which in one embodiment serves as an information presentation architecture for enabling users of iTV services to access a range of broadcast, on-demand programming and other content (which may or may not be related to a current broadcast and/or channel context of the television viewer), offered through an iTV network and made available via applications that may execute on a receiver such as a set-top box. The interactive user interface can be displayed at the same time as television programming, either as an overlay to television programming or with the television programming displayed in a scaled window.

In one embodiment, the present invention provides a content collection, distribution and display system that includes a server component configured to capture content for display to a television viewer by harvesting data from multiple data sources according to content collection rules specified in a configuration file that identifies locations from which the content can be harvested, and to produce a set of data files that include the harvested data, business rules and display rules for such data. The system also includes a distribution component coupled to receive the data files produced by the server component and to transmit the data files to a receiver utilizing a transmission channel (e.g., an in-band or out-of-band component of a satellite and/or cable television distribution network). Finally, the system includes a client component configured to receive the data files via the transmission channel and to populate a user interface, displayable to the television viewer simultaneously with other television programming via the receiver, with the harvested data as formatted data subject to the business rules and display rules.

The user interface may include a navigable menu area through which a user can select from among a variety of interactive television services. That is, the menu area provides access to a variety of services (e.g., video on demand services, game services, television programming related content services, managed content services, special interest services, self-provisioning services, chat services, email services, and television programming guide services) into which the content can be categorized. The user interface may also include a content display area in which those portions of the formatted data associated with a selected menu service are displayed to the television viewer. In some cases, this content is displayed in a rotating or ticker fashion (having both a passive mode, in which the formatted data is displayed in a sequence independent of any selection operations by a television viewer, and active mode, in which the formatted data is displayed in a sequence that depends on selection operations by the television viewer), with advertisements and/or promotions interspersed among the content items. In this way individual content items are displayed for configurable periods of time and then automatically replaced with new content items. The navigable menu area and the content display area may be displayed to the viewer at the same time as television programming is displayed on the television.

Within the user interface display, the displayed categories (e.g., news, weather, sports, entertainment, travel, special interest, demographic, world, national, regional, channel and program information, and local information) and services may change dynamically as new services are introduced and/or new business rules are defined by a network operator. The user interface may also include a content user interface component (referred to below as a content bar) that displays designated content (e.g., date/time/temperature information) regardless of what information is displayed in the content display area. Some embodiments of the present invention also provide for the display of communication alerts (such as e-mail alerts) via the user interface.

The content pieces, advertising and promotions may be organized and/or delivered according to configurable business rules defining content distribution across an iTV network. In this way, the content pieces, advertising and promotions, and preferred placement of elements of content, including tiles, within displayed categories may be dynamically controlled. The advertisements and/or promotions may be linked to services within the iTV network, and/or to an interactive capability to self-provision a related service. The business rules may be configured according to time of day, television channel, channel content, preferred placement, viewer demographic, viewer behavior, navigation context, and/or content category.

BRIEF DESCRIPTION OF THE DRAWINGS

The present invention is illustrated by way of example, and not limitation, in the figures of the accompanying drawings in which:

FIG. 2 illustrates one example of a content collection, distribution and display system having server and client components configured in accordance with an embodiment of the present invention.

DETAILED DESCRIPTION

Described herein is a user interface for iTV applications. The present user interface may be embodied as a television application that provides navigation, information and communication services together, over full-screen television or embedded/scaled television programming. The application serves as a user interface to iTV services (e.g., walled garden services) and content and may be accessed through operation of a remote control device or other operator controls of a set-top box. In one embodiment, the remote control device may have a dedicated input mechanism (e.g., a physical or virtual button or a programmable set of keystrokes, etc.) to allow for rapid access to the on-screen menu portion of the user interface. The present application interface uniquely combines information and navigation features. For example, a subset of offered services and content may be provided directly through an on-screen or other menu and links may be provided to allow the user access to expanded information and services in the context defined by the subset.

As indicated, the on-screen menu may be presented as an overlay over full-screen broadcast television. In other cases, the menu may be presented as part of a special screen (e.g., allowing for scaled television video presentation) or as a separate picture-in-picture. Regardless of the format of presentation, the menu acts as a user interface to provide access to network operator services (e.g., iTV and/or MSO services), timely pieces of information, promotional or advertising material, and in some cases will still allow a user to view regular television programming while the menu is being displayed.

Figure 1A:
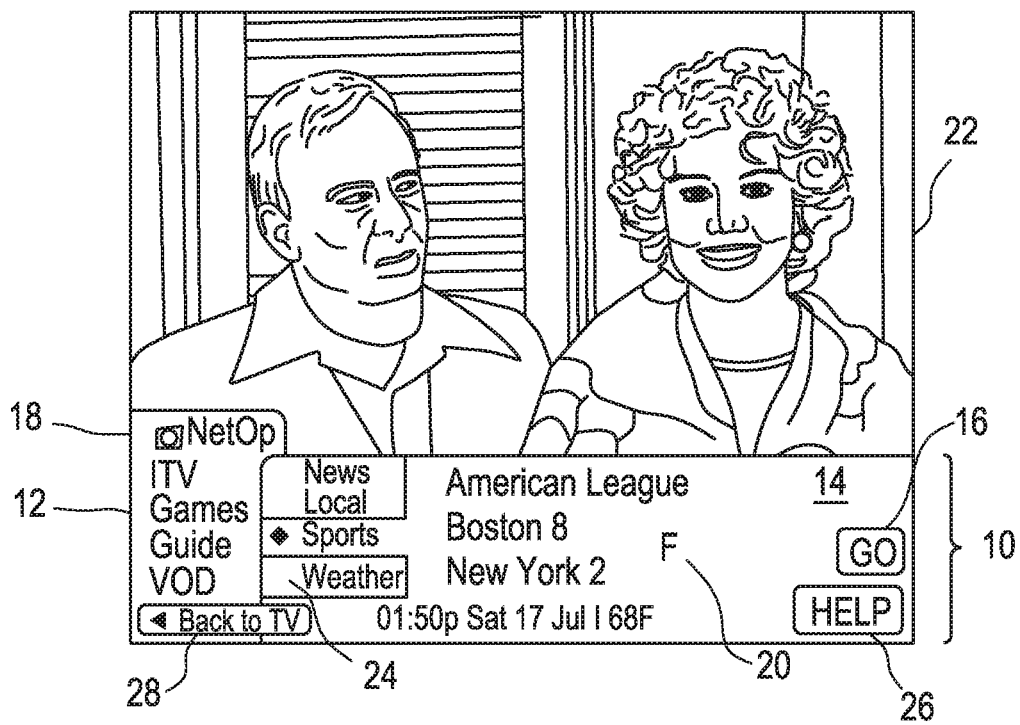
FIGS. 1A and 1B illustrate examples of on-screen menu and ticker portions of user interfaces for iTV services configured in accordance with embodiments of the present invention.
Figure 1B:
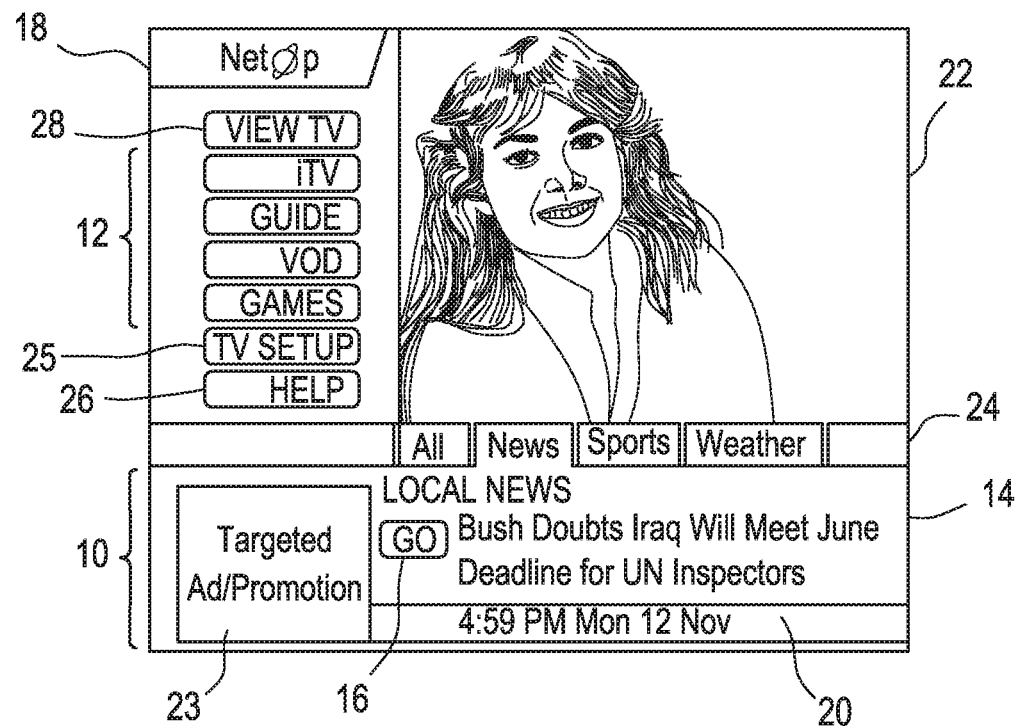
Figure 3:
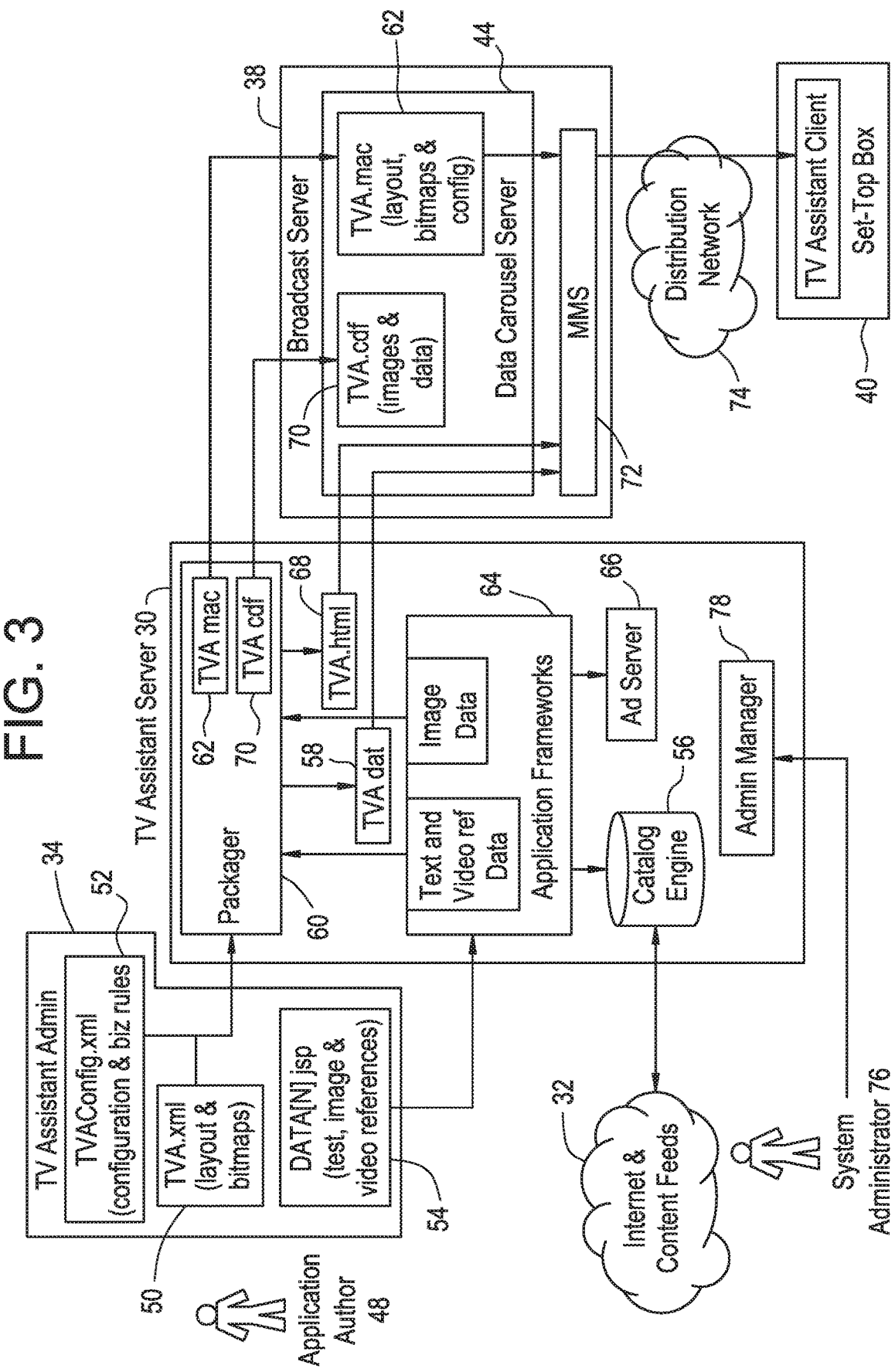
FIG. 3 illustrates another example of a content collection, distribution and display system having server and client components configured in accordance with an embodiment of the present invention.

FIGS. 1A and 1B illustrate examples of user interfaces configured in accordance with the present invention. The user interfaces depicted in these examples include an overlay menu referred to as a TV Assistant 10. In other embodiments, TV Assistant 10 is displayed together with a scaled version of the television program video. As indicated above, the TV Assistant 10 may appear on a television screen (not shown in detail in this view) whenever a user inputs an appropriate command sequence using an associated remote control unit. In one embodiment, the appearance/disappearance of the TV Assistant 10 is associated with user commands applied through a MENU button (or some other designated button or command input device) of a TV or set-top box remote control while watching television.

As shown in the illustration, key pieces of information (e.g., weather information, news headlines, sports scores, stock quotes, etc.) are displayed through TV Assistant 10. Components of TV Assistant 10 include a main menu 12, which serves as the main menu to various interactive services (e.g., walled garden content, VOD, games, etc.); and an information content area 14, which displays updated content pieces including but not limited to news headlines, sports scores, stock information, etc.

TV Assistant 10 can also provide access to extended content. That is, additional information related to the content pieces displayed in content area 14 can be seamlessly accessed by allowing the user to navigate from the TV Assistant 10 to any other iTV service including but not limited to walled gardens/portal application (e.g., retrieving the full story for a headline that appears in the TV Assistant's content area 14 can be accomplished by selecting an appropriate link using the remote control). Such access may be provided through a navigation feature such as "GO" button 16 or other graphical element.

Network operator branding may be provided through a graphical element 18. Alternatively or in addition, content provider branding may be provided in a similar fashion. Further, a Time/Date/Current Temperature display may be incorporated in a content bar 20. Navigation items that provide an exit back to regular television programming and/or to further information or assistance (Help) may also be provided as separate selection elements or as part of the content bar 20. Preferably, content and other items displayed in the content bar 20 are invariant with respect to the content displayed in the information content area 14. As shown, the TV Assistant 10 occupies only a portion of the total available television screen, leaving room for the regular television picture 22 to be displayed for user enjoyment.

In addition to these features, other information or services may be displayed/accessed through TV Assistant 10. For example, basic advertising through interstitial or persistent advertisements can be made available. Advanced advertising providing a receptacle 23 for targeted ads can also be accommodated, as shown in FIG. 1B. Communication services such as instant messaging or chat capabilities can be accessed through appropriate menu options and, of course, the TV Assistant 10 can be customized (e.g., through a set-up option 25) for particular content display. For example, the TV Assistant 10 provides a service operator and/or a user with the ability to customize the content types that populate the TV Assistant's content area 14 and/or lower content bar 20, such as selected stock quotes, weather forecasts for specific cities, etc.

In addition, alerts may be set, providing the ability to notify a user of incoming mail (e.g., e-mail or instant messages) or pre-selected content alerts such as stock price targets, etc. The TV Assistant 10 also provides a vehicle for promotions: That is, a network operator has the opportunity to promote various services, offers, etc., through this interface. Self-provisioning is also provided for through an interface for adding interactive services or programming packages.

Broadcast partner integration that is context sensitive to the broadcast channel to which the television is tuned provides the ability for the TV Assistant 10 to be populated by content that is specific to the currently tuned broadcast TV channel. The TV Assistant 10 also provides an interface for commerce services, allowing uses the ability to complete simple transactions. Of course, the TV Assistant 10 also acts as an interface for displaying program specific information synchronized to the broadcast TV program.

The menu choices on both the main menu 12 and ticker menu 24 may be configured subject to service provider requirements and the following is only intended to illustrate one possible implementation. In the example shown, the Interactive option (labeled ITV) provides access to the walled garden home (e.g., a Web Browser). The Games option provides access to various interactive games services. The Guide option provides access to an Electronic Program Guide and the VOD option launches video on demand service.

As indicated above, the Help button 26 provides access to a Help page in the walled garden. The Back to TV option 28 allows a user to exit from the TV Assistant 10 to full screen TV viewing. The lower content bar 20 may display Date/Time/Current Temperature, and in one embodiment the time is updated every 5 seconds at the same time a new ticker item is displayed in content area 14.

The ticker menu 24 acts to highlight the information provided in content area 14. That is, the ticker menu 24 provides a quick visual indication of the type of content currently being accessed/displayed. The ticker rotates through content items within the designated menu categories every 5 seconds (or other predetermined time period). For example, when accessing sports content, the ticker may cause new scores from different sporting events to be displayed in the content area 14 every 5 seconds. By default the ticker component always begins by cycling through the News items (or other user programmed menu selection) and then moves on to the other menu options.

If the user does not select any of the items in the ticker menu 24 he/she remains in what is referred to as "passive" ticker mode. In the passive ticker mode, the ticker cycles through all of the News items first, displaying associated content in content area 14, then automatically moves to the next category when all (or a subset of the) current News items have been displayed. The ticker continues in this fashion, cycling through all (or a network operator defined subset) of the content items in each ticker category until all categories have been exhausted and then repeats the procedure. The currently selected ticker category may be graphically represented with a background color matching the background color of the ticker menu 24. Therefore, when the ticker automatically changes from News to Local, the background color of the navigation button (shown as a highlighted portion of the ticker menu 24) changes automatically to reflect this category change.

In addition to the passive mode, TV Assistant 10 also provides an "active" ticker mode. The user has the option of selecting any of the ticker menu items using the remote control and entering active ticker mode. At that point, the user is presented with the ticker content for the selected category (e.g., the user may be presented with local news items or community messages when he/she selects the Local ticker category) and these content items will continue to repeat within content area 14 (e.g., changing every 5 seconds or other predetermined time period) until the user selects another ticker menu category. The active ticker category navigation button may be graphically represented with a background color matching the background color of the ticker. Additionally, the navigation button is also complemented with a graphic icon (a diamond in this example) to indicate that the user is in the active ticker state.

Text or graphic based ads/promotions can be presented in an interstitial type display as content rotates through the TV Assistant's content area 14. One display point for text-based promotions would be as an additional content ticker item in-between category changes when in passive ticker mode. In active mode, a promotion could appear as the first or last (or other) ticker item in the rotation.

When selected, the GO button 16 will link the user to the appropriate page in the walled garden that corresponds to the current content item displayed in the content area 14. For example, selecting "GO" while a news headline is being displayed will take the user to the story page for that headline in the walled garden. Of course, other selection mechanisms may be used.

The various buttons and other graphical items in this interface may change color to reflect state. For example:
  a. Unselected: White text on top of a background color.
  b. Selected: White text on top of a different background color which matches the color of the ticker content area 14, thus drawing a visual connection between the category button and the ticker contents.
  c. Selection Focus: White text on top of a unique background color representing the element with current focus. The user will be able to navigate to any selectable element. This may be represented by the background color of the element changing from the "unselected" background color to the "selection focus" color upon key press.

As shown in FIG. 2, the TV Assistant application utilizes both a server-side component and a client-side component. The server-side component is responsible for delivering data on a scheduled basis. Data delivery mechanisms may include, but are not limited to, one or more of the following: Internet Protocol (IP) messages, such as through in-band or out-of-band data pathways, or though an IF gateway product; or in-band or out-of-band carousel data. Such data may also be encapsulated within MPEG2 packets for transmission through the in-band broadcast system. The server-side component provides data from multiple disparate sources using a TV Assistant server 30. The server 30 extracts, collects, integrates, and deploys content and commerce from a variety of sources 32 such as web servers, raw television feeds, data sources (such as file servers, etc.) into new rich television-centric services. It allows existing Internet brands, content, and commerce services to be introduced to a new audience of viewers. Content is dynamically harvested, re-purposed and enriched for the television without affecting the existing technology infrastructure or publishing resources of the content provider.

As shown, content from the various sources 32 is retrieved by the TV Assistant server 30 and formatted according to instructions provided via a configuration file TVAConfig.xml. This configuration file (which can specify "business rules" for content collection, update, etc.) is created by the network or content service provider using a TV Assistant Administrator component 34. In this example, the file is an extensible markup language (XML) file, however, any convenient programming language may be used. TVAConfig.xml is used to create the selected contents and the delivery location of the TVAContents.txt file (discussed below). It allows the operator of a given head-end, through a web interface or other command interface, to specify information regarding content such as location, syndication sources, number of items displayed per source, etc. It also allows the operator to indicate where the TVAContents.txt file 36 is to be deployed, including, where appropriate, the IP address of an Applet Verification Server (AVS) 42 in the head-end and associated attributes such as start/end time, interval, and refresh rate. An example of the TVAConfig.xml file is:

```
<TVA_ServletConfig>
   <City>
      <Name>San Francisco</Name>
      <State>CA</State>
      <Zip>94111</Zip>
      <WorldNews_Url> (insert local URL for world news)
      </WorldNews_Url>
      <LocalNews_Url> (insert local URL for local news)
      </LocalNews_Url>
      <Sports_Url> (insert local URL for sports) </Sports_Url>
      <Weather_Url> (insert local URL for weather) </Weather_Url>
      <WorldNews_Count>5</WorldNews_Count>
      <LocalNews_Count>10</LocalNews_Count>
      <Sports_Count>8</Sports_Count>
      <Weather_Count>3</Weather_Count>
      <AVS_IP> (insert IP address of applet verification server)
      <AVS_IP>
   </City>
</TVA_ServletConfig>
```

In one embodiment of the present invention, a server-side servlet named TVAGenerator.java resident at the TV Assistant server 30 is responsible for capturing content by harvesting data from the multiple data sources 32 via a syndication server (not shown in detail) as specified in the TVAConfig file. One example of a syndication server suitable for this purpose is described in detail in U.S. patent application Ser. No. 09/841,017, entitled "METHOD AND SYSTEM FOR TRANSFORMING CONTENT FOR EXECUTION ON MULTIPLE PLATFORMS", filed Apr. 23, 2001 and assigned to the assignee of the present invention, the complete disclosure of which is hereby incorporated by reference. In addition, the TVAGenerator file formats the captured contents into a data file, TVAContents.txt, 36 uploads TVAContents.txt to an appropriate broadcast file server (BFS) 38 (e.g., as specified in the TVAConfig file), by using a TVAFileUploader utility 46 to transfer the file through a verification system (if necessary) such as Liberate's AVS 42.

In this example, TVAFileUploader 46 is a Java utility that uses HTTP POSTs to upload the data file 36. This file uploader is executed each time the TVAContents.txt file is updated and generated. The file uploader reads the TVAContents.txt file 36 into a byte array and delivers it over TCP/IP to the broadcast file server 38.

TVAContents.txt is the data file 36 that contains the content to be displayed in the TV Assistant 10. This file gets generated on a schedule, typically every 30 minutes but this time period is configurable by the network operator, to acquire the latest data, and is stored in the local file system of the server 30 where TVAGenerator.java runs. The broadcast server 38 is responsible for delivering data file 36 (TVAContents.txt) to the client-side application using the selected delivery mechanism (e.g., TCP/IP over an existing signaling channel or via a data carousel channel, etc.). The TV Assistant server 30 thus creates a file (TVAContents) 36 for distribution to a set-top box 40 via a network operator's existing content delivery platform. In this example, the file 36 is a text file but this is a design choice that may vary depending upon the system configuration and implementation.

After receiving the data file 36, the set-top box 40 is responsible for reading the file contents and displaying the corresponding content in the manner described above. In the present example of the client—server architecture of the TV assistant application, the client application is programmed in Java (TVA.java) and is utilized in conjunction with a commercially available broadcast file server 38, e.g., the Liberate Compact platform, and a Motorola DCT2000 set-top box 40. Other systems configured in accordance with the present invention may be implemented using other languages such as C, C++, etc. on other set-top boxes 40 and/or TV middleware platforms 38.

The client-side component is an application that can be accessed in one of several ways depending on the set-top platform being used. For example, the client application (i.e., the actual client-side computer software) may be flashed onto the set-top box 40 as a stand-alone application or as an extension (or customization) of some set-top box resident application, or TV middleware system; or a broadcast application that is carouseled to the set-top box 40 over an in-band or out-of-band data channel from the broadcast server 38. Advantages of deploying the TV Assistant as a resident application or an extension/customization of a resident application of a set-top box 40 include:

a. Instant access via the MENU (or other) button on the remote control;
b. Accessibility over any broadcast TV channel;
c. No latency in load time as a result of being resident in the set-top box memory;
d. Ability to launch other services such as VOD, Walled Garden, Mail, Self-provisioning, etc.

The TVA.java file instantiates itself in the set-top box 40 and specifies the user interface menu's on-screen size and location. This allows the TV assistant 10 to position itself in a specific region of the TV screen, for example as specified by x-y coordinates. Upon receipt of the TVAContents.txt file 36, the TVA.java file reads the data contained in that file 36 to populate the TV Assistant 10. In some cases, this involves reading in the latest information from TVAContents.txt based on a schedule through a timer event. TVA.java formats the information and displays the content for each timer event. This may include examining sports score strings to determine game status and, if the game is final, displaying winning team/score in a different color. Refreshing of content is accomplished by periodically looking for new TVAContents.txt files transmitted by the data carousel server 44 associated with broadcast server 38. The TVA.java file also enables navigation to any selectable element in the TV Assistant 10 (including other applications such as VOD, etc.) and displays the following button states: unselected, selected, and selected/focus.

Figure 6:
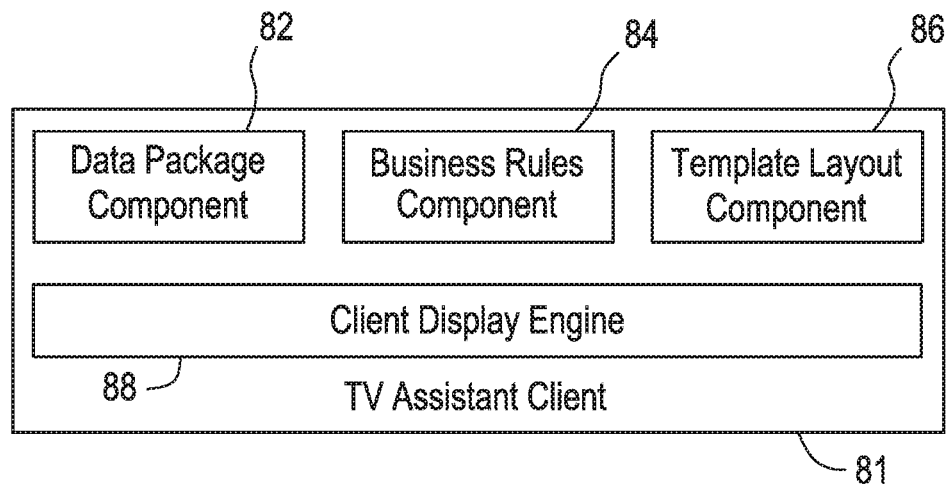
FIG. 6 illustrates an example of a client component of a TV Assistant configured in accordance with an embodiment of the present invention.

As shown in FIG. 6, the TV Assistant client component 81 itself includes four components (a data package component 82, a business rules component 84, a template layout component 86 and a client display engine 88), which cooperate to render the TV Assistant 10 as seen by the television viewer. That is, these four components accept, interpret and present the content delivered by the broadcast server 38 to the television viewer.

Figure 7:
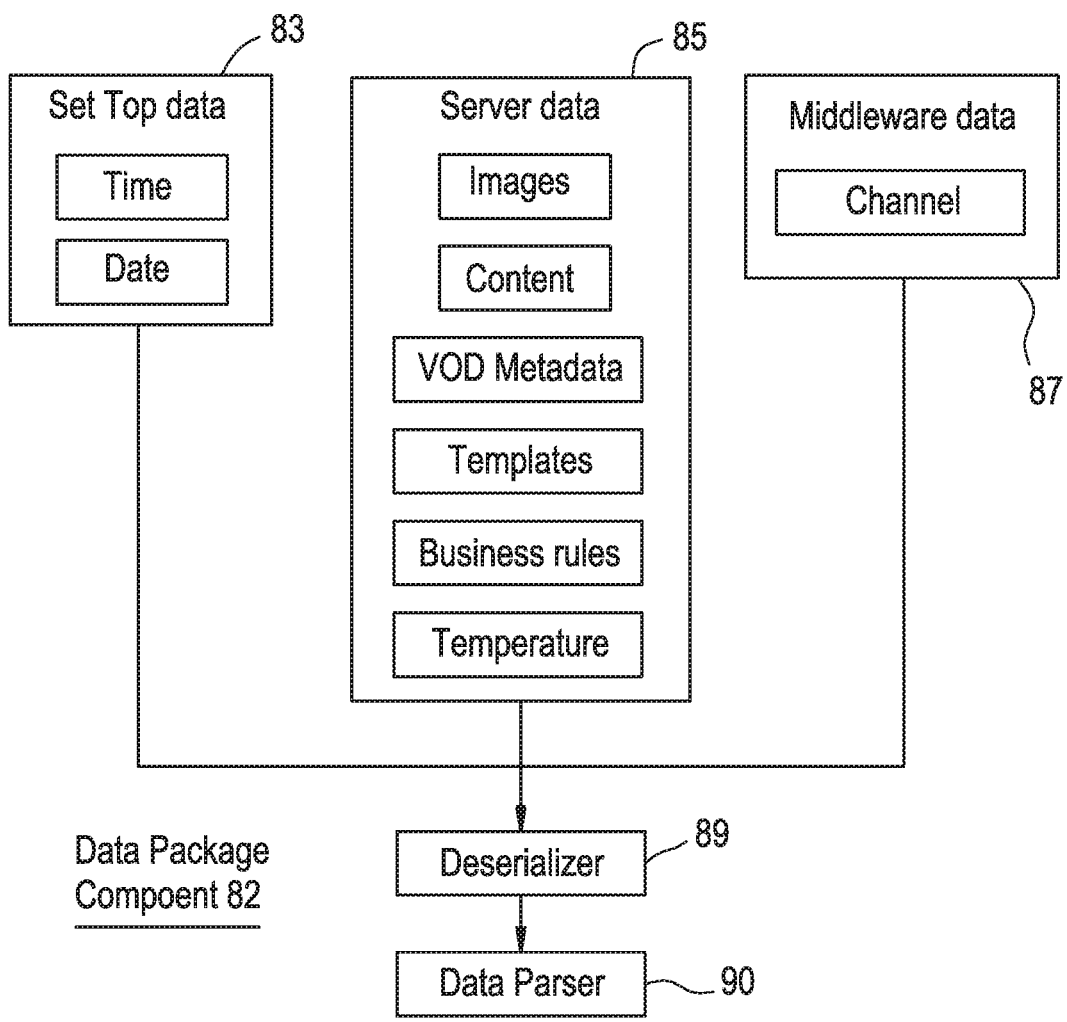
FIG. 7 illustrates an example of a client data package component of a TV Assistant client configured in accordance with an embodiment of the present invention.

The client data package component 82 is shown in detail in FIG. 7 and is responsible for receiving and parsing data elements and preparing them for display. The data package component 82 communicates with the distribution system to retrieve data packages (including set-top data 83, server data 85 and middleware data 87) as they are received, or as demanded by the client display engine 88. The data package component 82 includes a deserializer 89 and data parser 90, which together deserialize and interpret any optimized XML and binary data received from the server-side packaging component. Data package component 82 communicates with the client display engine 88 that creates and manages the data objects representing the data that is received in packages. Business rules metadata and template layouts are deserialized and reconstructed into objects for the business rules and template layout components 84 and 86, respectively. The data package component 82 communicates with the set-top box operating system interfaces to resolve references to set-top related data 83, such as time and date; and communicates with the resident middleware system to resolve references and requests for middleware data 87, such as current channel information. Other data (such as images, content for the ticker and content bar, VOD metadata and the like) is treated as server data 85 for the TV Assistant 10.

Figure 8:
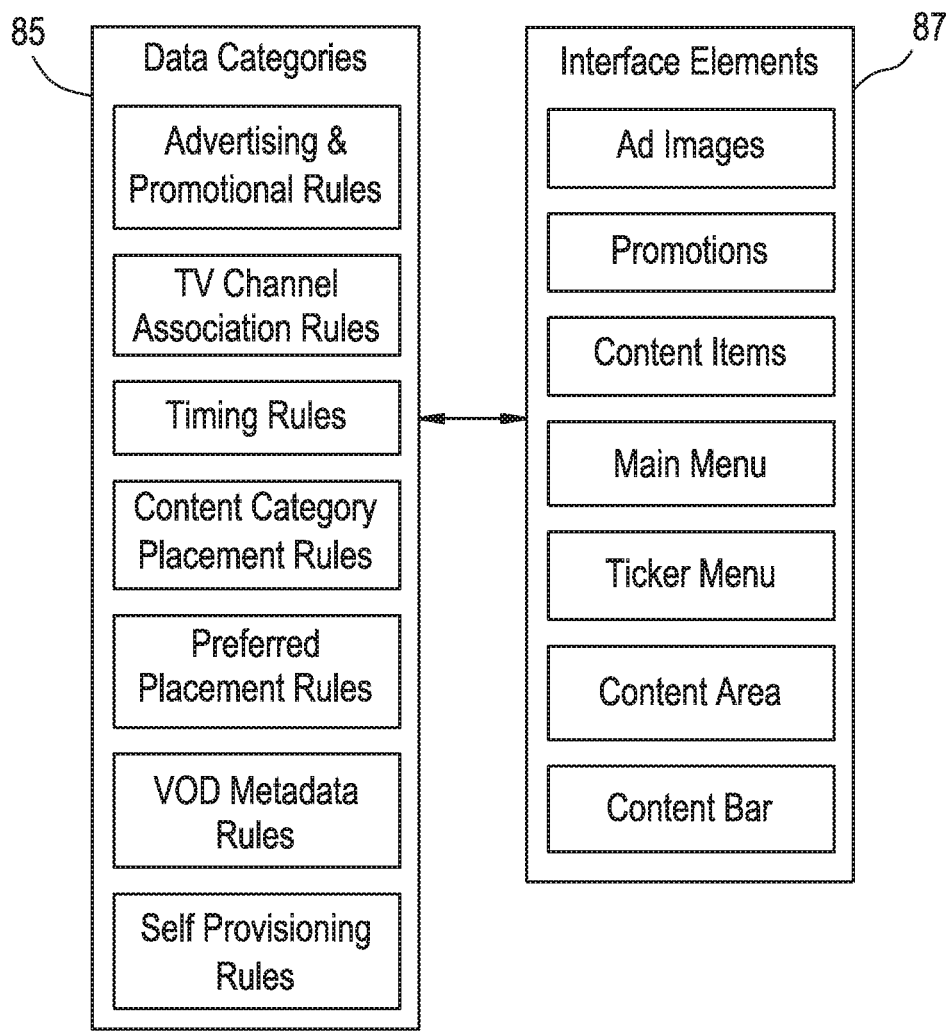
FIG. 8 illustrates an example of a business rules component TV Assistant client configured in accordance with an embodiment of the present invention.

The business rules component 84 is shown in detail in FIG. 8 and is responsible for constructing business rules objects and applying these business rules to template objects as directed by the template layout component 86. In one embodiment, business rules are described in XML format and define placement or other objectives that may be based on criteria such as: time of day, current channel, current broadcast content, viewer demographic, viewer behavior, navigation context and/or current content category.

As shown in the illustration, the business rules themselves may, in one embodiment, comprise rules associated with the following data categories 85:

i. Advertising and Promotional rules
ii. TV channel association rules
iii. Timing rules (for rotation of content, ads and promotions)
iv. Category placement rules
v. Preferred placement rules
vi. VOD metadata rules
vii. Self provisioning rules The business rules component 84 receives the business rules data from the data package component 82, interprets them, and provides instructions that will eventually be applied to layout objects by the template layout component 86 and the client display engine 88. The business rules component 84 determines what interface elements 87 (data, images, ads, menu choices, etc.) are shown and when, and in what order and sequence those elements should be displayed. In one embodiment this may include displaying an advertisement for a sports product when the viewer is tuned to a sports channel. In another embodiment this may include providing links to a specific video when a user is on a specific channel at a specific time.

An example that illustrates the business rules metadata that is authored and/or generated by the server to control these display parameters is given below:

```
<?xml version="1.0" encoding="UTF-8"?>
<meta-business-rules>
    <ad-location-list start="1" end="9">
        <location id="1">
            <campaign id="1" start="1" end="4"/>
            <campaign id="11" start="5" end="7"/>
            <campaign id="1" start="8" end="9"/>
        </location>
        <location id="2">
            <campaign id="12" start="1" end="3"/>
            <campaign id="3" start="3" end="5"/>
            <campaign id="12" start="6" end="9"/>
        </location>
        <location id="3">
            <campaign id="5" start="1" end="3"/>
            <campaign id="15" start="4" end="7"/>
        </location>
    </ad-location-list>
    <ad-campaign-list start="1" end="9">
        <campaign id="1" displayrule="1">
```

```
        <ad id="1" adtype="1" href="String" src="String"
displayruledata="1"/>
        <ad id="7" adtype="1" href="String" src="String"
displayruledata="2"/>
        <ad id="4" adtype="1" href="String" src="String"
displayruledata="3"/>
    </campaign>
    <campaign id="3" displayrule="2">
        <ad id="8" adtype="2" href="String" src="String"
displayruledata="1"/>
        <ad id="2" adtype="2" href="String" src="String"
displayruledata="2"/>
        <ad id="5" adtype="2" href="String" src="String"
displayruledata="3"/>
    </campaign>
</ad-campaign-list>
<channel-association-list start="1" end="9">
    <content-type id="1">
        <channel id="3" start="1" end="4" />
        <channel id="4" start="1" end="5" />
        <channel id="11" start="3" end="9"/>
        <channel id="13" start="1" end="9"/>
    </content-type >
    <content-type id="2">
        <channel id="3" start="1" end="3"/>
        <channel id="5" start="2" end="9"/>
    </content-type >
</channel-association-list>
<link-association-list start="1" end="9">
    <content-link-type id="1">
        <channel-type id="3" start="1" end="4" >
            <application id=21233 />
        </channel-type>
        <channel-type id="3" start="5" end="9" >
            <application id=21244 />
        </channel-type>
        <channel-type id="4" start="1" end="9" >
            <application id=21413 />
        </channel-type>
    </content-link-type >
    <content-link-type id="2">
        <channel-type id="3" start="1" end="3">
            <service id=11233 />
        </channel-type>
        <channel-type id="3" start="4" end="9">
            <service id=11222 />
        </channel-type>
        <channel-type id="7" start="3" end="9">
            <application id=21255 />
        </channel-type>
        <channel-type id="11" start="1" end="9">
            <service id=21215 />
        </channel-type>
    </content-link-type >
</link-association-list>
<content-rotation-list start="1" end="9">
    <content-type id="1">
        <channel-type id="2" start="1" end="9">
            <rotation displayrule="2" displayruledata="7" />
        </channel-type>
        <channel-type id="3" start="1" end="3">
            <rotation displayrule="1" displayruledata="5" />
        </channel-type>
        <channel-type id="3" start="4" end="7">
            <rotation displayrule="0" />
        </channel-type>
        <channel-type id="3" start="8" end="9">
            <rotation nodisplay="true" />
        </channel-type>
        <channel-type id="4" start="5" end="9">
            <rotation displayrule="1" displayruledata="5" />
        </channel-type>
        <channel-type id="0" start="1" end="9">
            <rotation displayrule="2" displayruledata="4" />
        </channel-type>
    </content-type >
    <content-type id="2">
        <channel-type id="2" start="1" end="9">
            <rotation displayrule="1" displayruledata="3" />
        </channel-type>
        <channel-type id="3" start="1" end="9">
            <rotation displayrule="1" displayruledata="5" />
        </channel-type>
    </content-type >
</content-rotation-list>
<preferred-placement-list start="1" end="9">
    <provider id="1233">
        <channel id="2" start="1" end="9">
            <placement displayrule="2" displayruledata="1" />
        </channel >
        <channel id="3" start="1" end="4">
            <placement displayrule="1" displayruledata="1" />
        </channel >
    </provider>
    <provider id="1453">
        <channel id="4" start="1" end="9">
            <placement displayrule="1" displayruledata="4" />
        </channel >
        <channel id="7" start="3" end="6">
            <placement displayrule="1" displayruledata="4" />
        </channel >
    </provider>
    <service id="3253">
        <channel id="4" start="1" end="9">
            <placement displayrule="2" displayruledata="4" />
        </channel >
    </service>
    <provider-type id="1">
        <channel-type id="2" start="1" end="9">
            <placement displayrule="3" displayruledata="4" />
        </channel-type>
        <channel-type id="3" start="1" end="3">
            <placement displayrule="2" displayruledata="2" />
        </channel-type>
        <channel-type id="1" start="1" end="9">
            <placement nodisplay="true" />
        </channel-type>
        <channel-type id="0" start="1" end="9">
            <placement displayrule="2" displayruledata="4" />
        </channel-type>
    </provider-type >
</preferred-placement-list>
</meta-business-rules>
```

Figure 9:
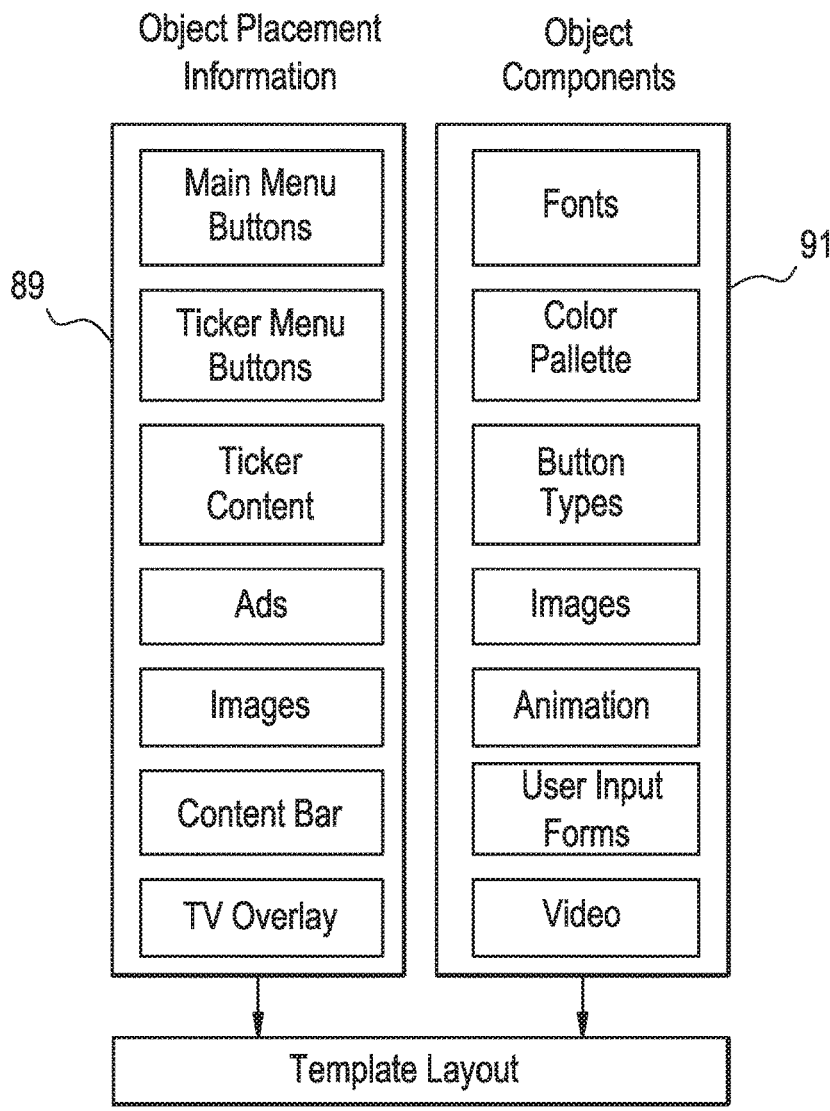
FIG. 9 illustrates an example of a template layout component of a TV Assistant client configured in accordance with an embodiment of the present invention.

The template layout component 86 is shown in detail in FIG. 9 and receives template definitions and data (content, ads, promotions, and VOD metadata) from the data package component 82, layout factors and rules from the business rules component 84 (which collectively are organized as content placement information 89 and object components 91) and prepares the interface for display by the client display engine 88. The template layout component 86 identifies all the aspects of the TV Assistant interface and orders them into a viewable user interface. It is responsible for creating a logical navigation structure for each screen, positioning of defined objects on a screen, and communicating information between objects and screen using the client display engine interfaces.

Figure 10:
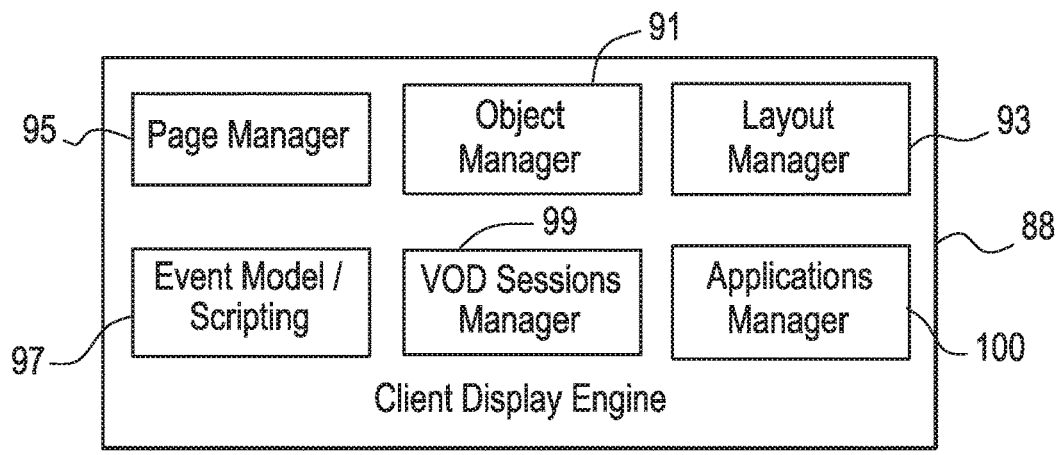
FIG. 10 illustrates an example of a client display engine of a TV Assistant client configured in accordance with an embodiment of the present invention.

The client display engine 88 is shown in detail in FIG. 10 and constructs and manages the objects (via object manager 91) that are used throughout the TV Assistant client 81. The client display engine 88 provides a set of interfaces for the other components of the client to manipulate these objects. It receives data and instructions from the data package component 82, the business rules component 84 and the template layout component 86 and generates the interface display on the set top box 40 for the viewer. The client display engine 88 manages the layout and navigation elements of the user interface via layout manager 93 and can provide links to other applications. It is responsible for monitoring user activity and generating the appropriate response. It includes a scripting and event model 97, which in one embodiment may be similar to Javascript, that provides a procedural language that a template author may use to program the display object model and business rules object model, and to respond programmatically to user events. It also includes a run-time cache object (page manager 95) that stores information about objects and pages and forthcoming pages for faster performance and reduced latency during page transitions. Other modules include a VOD sessions manager 99 and an application manager 100.

The client component, TVA.java, thus includes java classes and utilities for image manipulation, swapping, button functionality and text control. All of these assets along with all image assets, which in one embodiment are optimized through Liberate's VQ compression tool, are packaged into a file, TVA.jar, and either uploaded to the BFS 38 on a schedule or, ideally, flashed to the set-top box 40 a master application for best performance and ease of access.

In operation, the data file 36 (TVAContents.txt) is continuously broadcast to the set-top box 40 over either an in-band or out-of-band data channel. On the Liberate Compact platform, the data file 36 is delivered in an out-of-band channel in order for TV Assistant 10 to work over any analog or digital broadcast channel. A typical out-of-band channel provides approximate bandwidths of 2 Mb/sec downstream and 300 K/sec upstream.

The size of the data file 36 is entirely dependent upon the amount of information that populates the TV Assistant 10. Below are a few potential scenarios:

Scenario 1 (Approximately 3K File Size)
5 news headlines
5 sports headlines/scores
5 local headlines
15 sports scores
1 city weather forecast (3 day)
5 promotional headlines Scenario 2 (Approximately 5K File Size)
10 news headlines
10 sports headlines
5 local headlines
5 entertainment headlines
20 sports scores
20 stock quotes
5 city weather forecast
5 promotional headlines

Having thus described the individual components of the present content collection, distribution and display system, it is helpful to discuss an example of how this architecture is used. In the following example, specific details are provided for the creation, optimization, and automation of a TV Assistant specific to a platform configuration comprising Liberate's Compact 3.2.47 with MAC-J "Elmo" running on a Motorola DCT 2000 set-top box. These details are provided so that those of ordinary skill in the art can more fully appreciate certain implementations of the materials discussed above, however, this example should not be read as limiting the broader scope of the present invention to these implementation details.

Using authoring tools provided, for example, in the TV Assistant Administrator component 34, the application author 48 (e.g., an iTV network operator) generates the necessary layout and data templates for the TV Assistant application, and deploys them to the application server 30. The layout templates (TVA.xml) 50 may be bundled with any bitmap images used for buttons, user interface controls, etc. This allows the network operator to customize the look and feel of the TV Assistant 10 as it will ultimately be displayed to the television viewer.

The business rules and configuration data file (TVAConfig.xml) are also authored and specify the rules for organizing and placing content, promotions and advertising within the TV Assistant. In this example, dynamic data generation templates (used to generate dynamic text data, image and video references) are created as Java Server Pages (DATA[N].jsp) 54 that conform to the Application Frameworks XML language developed by the assignee of the present invention, which provides a set of executable tags to access dynamic data harvested by a catalog engine 56. When executed, these templates 54 create a set of named data packages (TVA.dat) 58. Further details regarding this process may be found in the above-cited U.S. patent application Ser. No. 09/841,017.

The TVA.xml file 50 is run through a packager component 60 of the TV Assistant server 30, which uses extensible stylesheet language transformations (XSLT) to transform the XML information to a highly optimized, binary XML format file (TVA.mac) 62. These templates reference the contents of data packages via predetermined hierarchical package name references. The packager 60 then transports the TVA.mac file 62 directly to the Liberate broadcast server 38, where the Liberate Mediacast server 44 carousels TVA.mac to the set-top box 40 via an in-band channel. This process only needs to occur once, or as often as the application designer wishes to make changes to the layout and application behavior.

With data templates already residing on the TV Assistant server 30, processes need to occur to execute and create the dynamic data packages with their text data, image and video reference information. This process is initiated by specifying the data generation business rules within the TV Assistant Admin component 34 for scheduling data packages. In some cases, this may be done through a web-type interface (Admin Manager) 78 associated with server 30. According to the specified schedules, the packager 60 will initiate execution of the data templates (DATA[N].jsp) 54 via an Application Frameworks component 64 of server 30.

The DATA[N].jsp pages are broken into separate file types: those containing text data, including video url references, and those containing the image assets related to that data (backgrounds, photos, ads, etc.). When the DATA[N].jsp files are executed by the Application Frameworks component 64, the latest text, video references and image data are retrieved from the catalog engine 56. Independently, the catalog engine 56 is configured to harvest, process and store related data and metadata from content feeds 32, asset distribution interface (ADI) packages, and/or the Internet. If desired, an advertising server 66 may be invoked to resolve any advertising and/or promotion resources that are being provisioned for the given period as configured by the TV Assistant Admin 34. Dynamic business rules defined by the network service provider to be applied by the TV Assistant application client are retrieved and packaged with the data.

The DATA[N].jsp pages are processed by the Application Frameworks component 64 and the dynamic data sets returned to the packager 60. The packager transforms the text and video reference portion of the data into a binary format file (TVA.dat) 66. The packager then generates TVA.html files 68 for the image portion of the data, and these files refer back to the image data. Finally, the packager generates an TVA.cdf file 70 containing references to the TVA.dat and TVA.html files 58 and 60 and posts this to the data carousel (DC) server 44.

The DC server 44 parses the TVA.cdf file 70 and downloads all the necessary data files referenced therein. It will also render the images referenced by the TVA.html files 68 into MPEG I-Frames and P-Frames, as required. The DC server 44 creates objects in Mediacast Signaling Protocol (MSP—a protocol for data broadcasting to set top boxes that allows any number of clients to access a carousel without increasing the downstream bandwidth required) format and sends them to the multimedia streamer (MMS) component 72 of broadcast server 38 for transport to set-top box 40 via the distribution network 74. At this point the necessary data and transport stream files will be spinning continuously on the carousel over an in-hand channel. Additionally, the application client, which provides the execution platform and APIs used to implement the TV Assistant application, could itself be included in this carousel if it has not already been flashed onto the set-top box 40.

A system administrator for the network service provider can access the Admin Manager web interface 78 for the TV Assistant server 30 at any time to complete a number of tasks, including the ability to: modify configurations for the TV Assistant application, modify advertising and promotion campaign settings, change ticker settings, change business rules settings, change content harvesting sources, specify schedules and business rules for creating data packages, and a host of other activities.

Figure 4A:
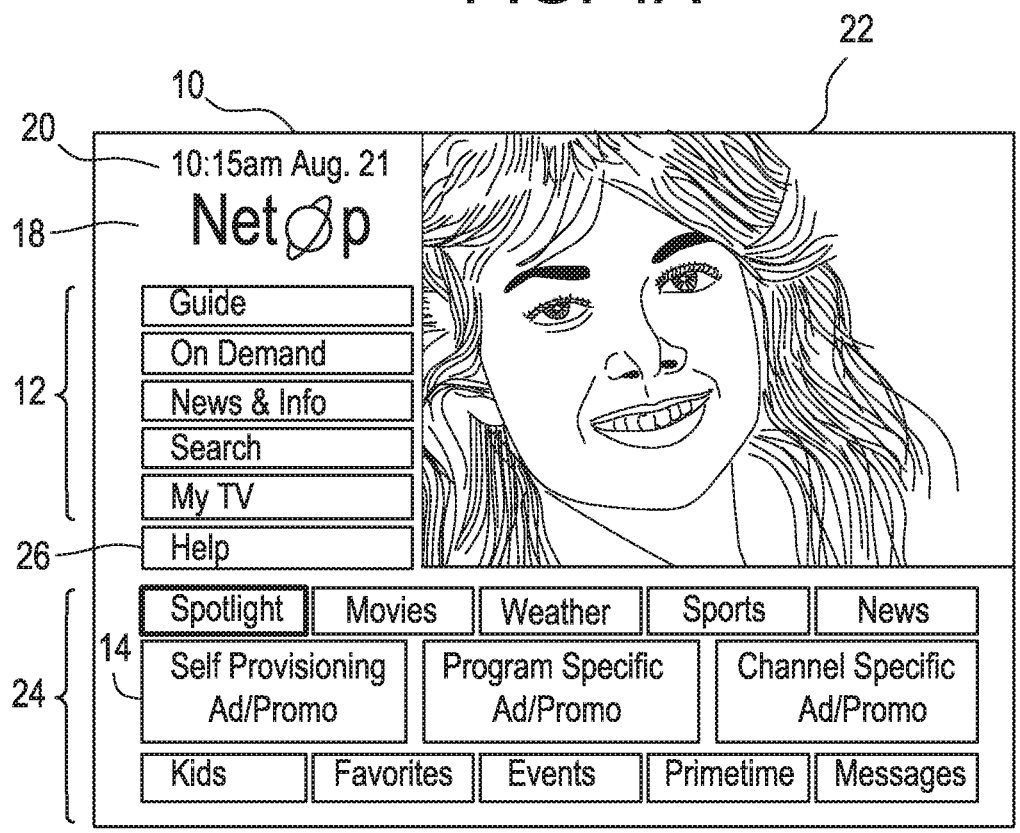
FIG. 4A illustrates a further example of an on-screen menu portion of a user interface for iTV services configured in accordance with an embodiment of the present invention in which a menu overlay is used.

Having examined the content collection and distribution architecture, some further examples of the on-screen menu portion of the present user interface may be described. As indicated above, the TV Assistant may be displayed as an overlay menu simultaneously with television video. FIG. 4A provides an example of such a display. In this example, the TV Assistant 10 is displayed over regular television program video 22, but that video is still viewable. Components of the TV Assistant 10 have been organized in a different fashion than was the case in FIG. 1, for example the content bar 20 now appears at the upper left of TV Assistant 10 and the number and types of main menu 12 categories and ticker categories 24 have changed, but the functionality provided by TV assistant 10 has not changed.

Figure 4B:
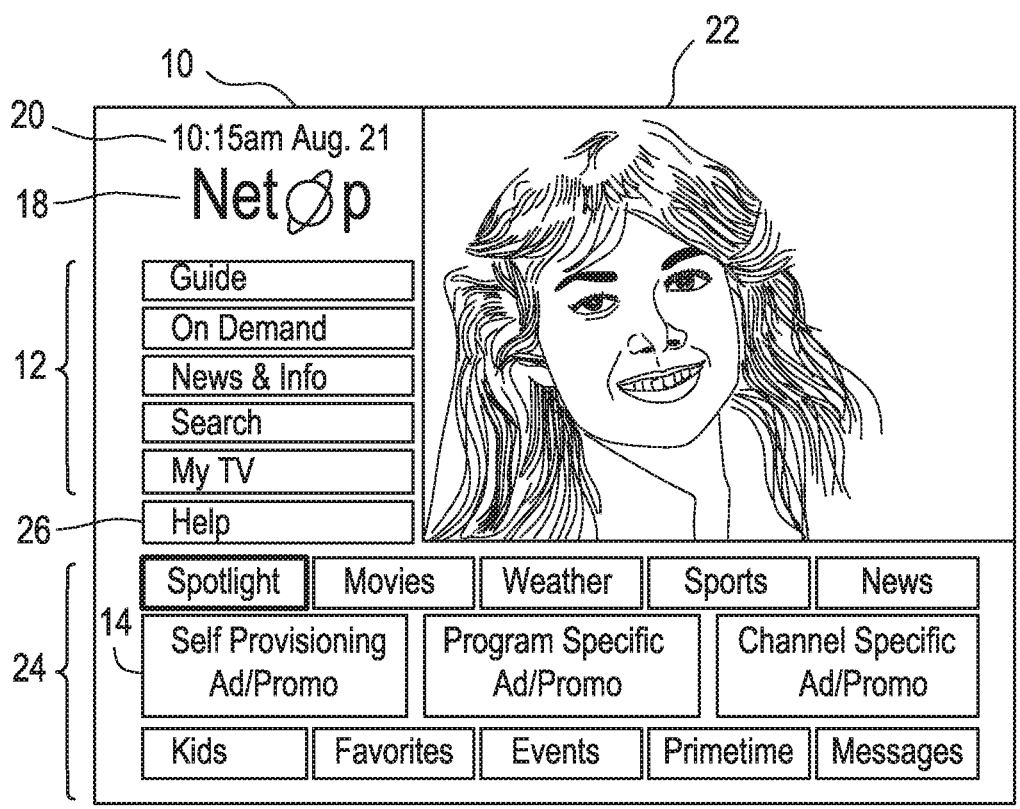
FIG. 4B illustrates a further example of an on-screen menu portion of a user interface for iTV services configured in accordance with an embodiment of the present invention in which scaled television video is used.

Referring now to FIG. 4B, the same features, functionality and layout for TV Assistant 10 are presented as was the case for the FIG. 4A embodiment, with the exception that the television video 22 is now displayed in a scaled fashion. That is, the television video 22 is displayed in a window framed by TV Assistant 22, but the image so displayed is a scaled representation of what would otherwise occupy the entire television screen if the TV Assistant 10 were not displayed. Such image scaling may be accomplished using conventional picture-in-picture or split screen image presentation technology as exists in many television receives and/or set-top box units.

Figure 4C:
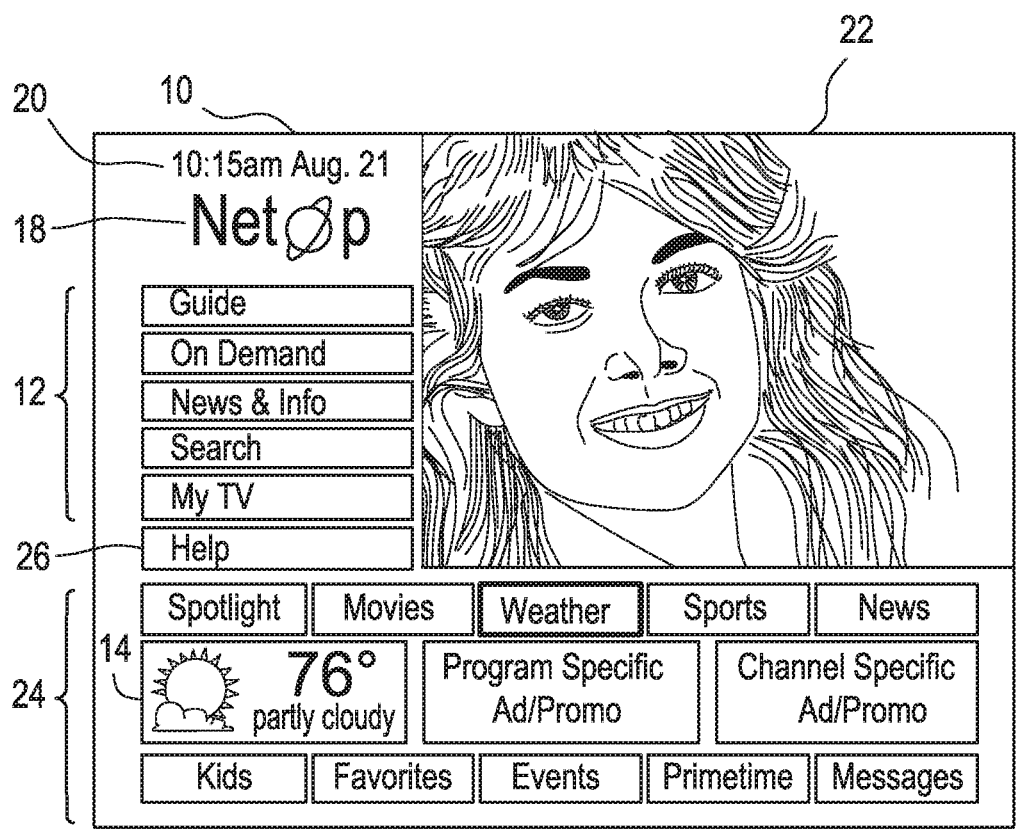
FIG. 4C illustrates yet another example of an on-screen menu portion of a user interface for iTV services configured in accordance with an embodiment of the present invention in which ticker state has changed from that shown in FIG. 4A.

FIG. 4C illustrates an example of TV Assistant 10 when the ticker state has changed. Compare the illustration set forth in FIG. 4A to that in FIG. 4C. Notice that the ticker state has changed from "Spotlight" to "Weather" and the corresponding content in content area 14 has changed to reflect current weather conditions. This is one example of how content is rotated within the content area 14. The ticker menu 24 now has the "Weather" menu highlighted to reflect the ticker state, as described above. Similar state changes could be reflected if the scaled television video representation was used.

Earlier it was noted that the TV Assistant provided a mechanism for broadcast partner integration that is context sensitive to the broadcast channel to which the television is tuned. That is, the TV Assistant may be populated by content that is specific to the currently tuned broadcast TV channel. An example of such functionality is shown in FIGS. 5A and 5B.

Figure 5A:
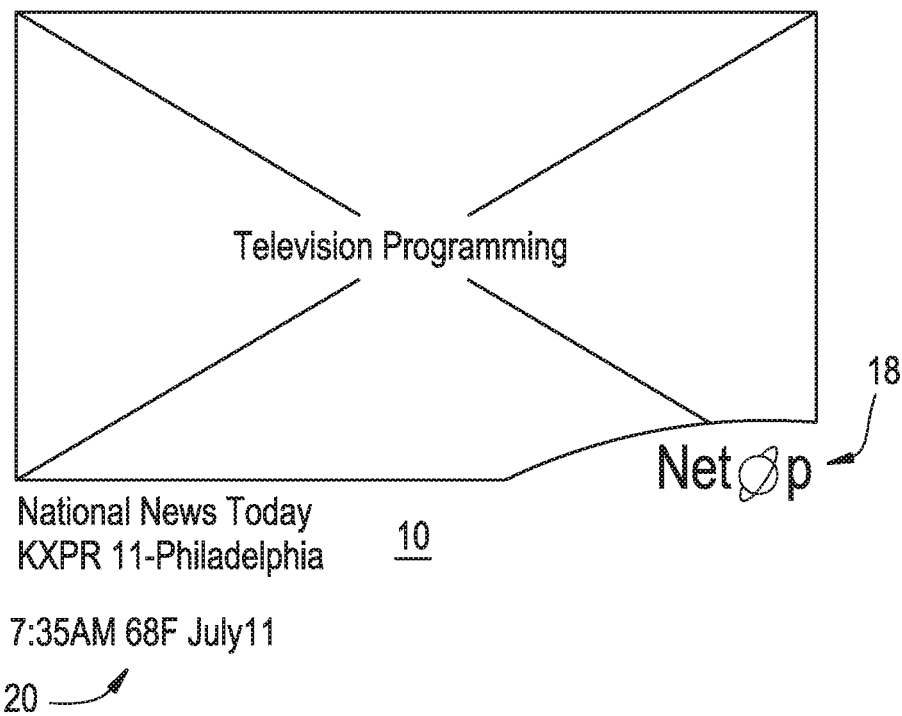
FIGS. 5A and 5B illustrate an example of a TV Assistant configured in accordance with an embodiment of the present invention, and which becomes populated by content that is specific to a currently tuned broadcast TV channel.

FIG. 5A illustrates an example of the TV Assistant 10, this time shown without any television video. This example illustrates one configuration of TV Assistant 10 as might be displayed in connection with a television channel for which there is no corresponding context sensitive information which the broadcaster or network operator wishes to provide access. In other words, the TV Assistant 10 is displayed in a basic form as an informational overly with basic information about the current channel (e.g., channel number, broadcaster call letters, etc.) and the lower content bar 20.

Figure 5B:
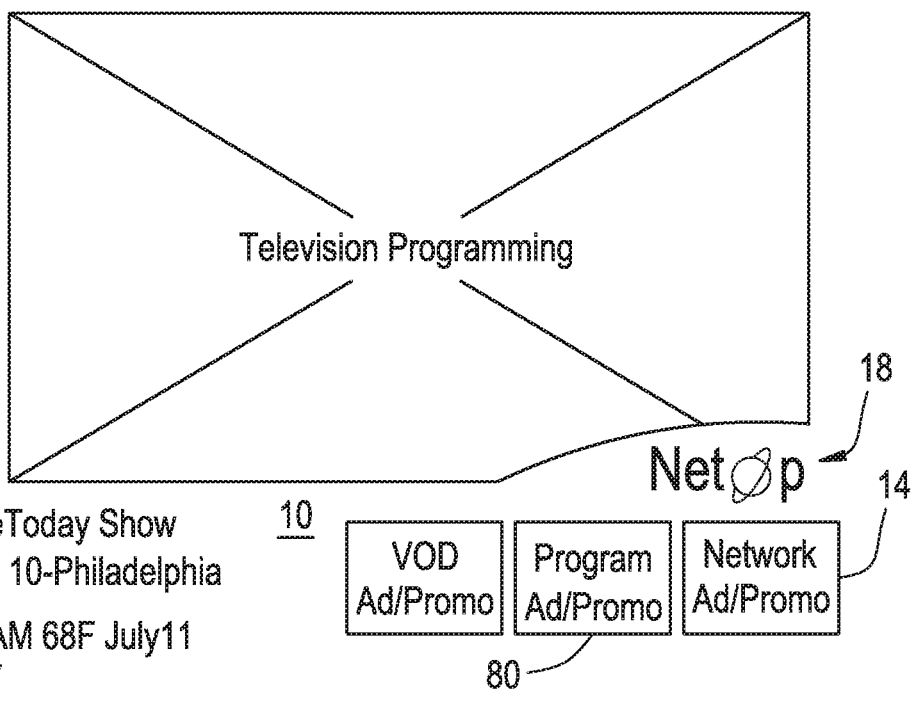

When the viewer changes channels to a channel for which there is context sensitive information which the broadcaster or network operator wishes to provide access to, however, the content displayed within TV Assistant 10 changes, as shown in FIG. 5B. In this example, a more advanced interface is presented with broadcaster specific content displayed in the content area 14. For example, news and weather interactive content services may be made available to the viewer via the TV Assistant user interface. Rather than being presented as text highlights as in the previous examples, in this case such interactive content is signaled using graphical elements such as tiles 80, which can be selected by a viewer using a remote control similar to the way in which one might use a computer's cursor control device to select a hyperlink displayed in a web browser. In this way, the TV Assistant user interface may extend the television broadcast content by presenting an interactive content area that includes time or context sensitive messages or other items (e.g., in the form of a tiled grid or as textual references) based on business rules such as time of day, channel selected, and so on. This presents viewers with additional opportunities to select on-demand content supplemental to the broadcast or promoted by the broadcaster, programmer, advertiser or network operator.

Thus, an interactive user interface for television applications has been described. Content for display through the TV Assistant application is retrieved and packaged for delivery using the TV Assistant server 30. The data package is delivered via various protocols including TCP/IP or out-of-band broadcast to populate the content area 14 of the on-screen menu. Selecting any sub category, e.g., News, Sports, Weather, of main menu 12 changes the displayed content to that topic. Selecting the "GO" button 16 drives the user to the related page in the walled garden for more information on that particular headline/item.

The invention claimed is:
1. An apparatus comprising:
one or more processors; and
memory storing executable instructions that, when executed by the one or more processors, cause the apparatus to:
cause display, within a guide menu and in a first repeatedly-rotating sequence, of a plurality of content items associated with a plurality of menu categories; and
based on receiving a selection associated with a particular menu category of the plurality of menu categories, cause display, within the guide menu and in a second repeatedly-rotating sequence, of a set of content items, of the plurality of content items, associated with the particular menu category.
2. The apparatus of claim 1, wherein the first repeatedly-rotating sequence is based on a sequential display order that causes display of each content item associated with a first menu category before causing display of each content item associated with a second menu category.

3. The apparatus of claim 1, wherein the particular menu category is for news content.

4. The apparatus of claim 1, wherein the particular menu category is for sports content.

5. The apparatus of claim 1, wherein the particular menu category is for weather content.

6. The apparatus of claim 1, wherein the plurality of menu categories is for a plurality of types of content, and wherein, for each of the plurality of menu categories, a menu category is for a type of content that is different from each other type of content of the plurality of types of content.

7. The apparatus of claim 1, wherein the executable instructions, when executed by the one or more processors, cause the apparatus to:
cause display of an advertisement between two content items of the plurality of content items.

8. The apparatus of claim 1, wherein the executable instructions, when executed by the one or more processors, cause the apparatus to:
cause display of an advertisement between two content items of the set of content items.

9. An apparatus comprising:
one or more processors; and
memory storing executable instructions that, when executed by the one or more processors, cause the apparatus to:
cause display, within a guide menu and in a first repeatedly-rotating sequence, of a first set of content items, of a plurality of content items, associated with a first menu category of a plurality of menu categories, wherein the plurality of content items are associated with the plurality of menu categories;
based on causing display of a last content item from the first set of content items, cause display, within the guide menu and in the first repeatedly-rotating sequence, of a second set of content items, of the plurality of content items, associated with a second menu category; and
based on receiving a selection associated with the second menu category, cause display, within the guide menu and in a second repeatedly-rotating sequence, of the second set of content items.

10. The apparatus of claim 9, wherein the first repeatedly-rotating sequence is based on a sequential display order that causes display of each content item associated with the first menu category before causing display of each content item associated with the second menu category.

11. The apparatus of claim 9, wherein the second menu category is for news content.

12. The apparatus of claim 9, wherein the second menu category is for sports content.

13. The apparatus of claim 9, wherein the second menu category is for weather content.

14. The apparatus of claim 9, wherein the plurality of menu categories is for a plurality of types of content, and wherein, for each of the plurality of menu categories, a menu category is for a type of content, of the plurality of types of content, that is different from each other type of content of the plurality of types of content.

15. One or more non-transitory computer-readable media storing executable instructions that, when executed, cause an apparatus to:
cause display, within a guide menu and in a first repeatedly-rotating sequence, of a plurality of content items associated with a plurality of menu categories; and
based on receiving a selection associated with a particular menu category of the plurality of menu categories, cause display, within the guide menu and in a second repeatedly-rotating sequence, of a set of content items, of the plurality of content items, associated with the particular menu category.

16. The one or more non-transitory computer-readable media of claim 15, wherein the first repeatedly-rotating sequence is based on a sequential display order that causes display of each content item associated with a first menu category before causing display of each content item associated with a second menu category.

17. The one or more non-transitory computer-readable media of claim 15, wherein the particular menu category is for news content.

18. The one or more non-transitory computer-readable media of claim 15, wherein the particular menu category is for sports content.

19. The one or more non-transitory computer-readable media of claim 15, wherein the particular menu category is for weather content.

20. The one or more non-transitory computer-readable media of claim 15, wherein the plurality of menu categories is for a plurality of types of content, and wherein, for each of the plurality of menu categories, a menu category is for a type of content, of the plurality of types of content, that is different from each other type of content of the plurality of types of content.

* * * * *

UNITED STATES PATENT AND TRADEMARK OFFICE
CERTIFICATE OF CORRECTION

PATENT NO. : 10,587,930 B2
APPLICATION NO. : 16/160375
DATED : March 10, 2020
INVENTOR(S) : Chane et al.

It is certified that error appears in the above-identified patent and that said Letters Patent is hereby corrected as shown below:

On the Title Page

Column 1, Related U.S. Application Data, Line 1:
Delete "(60)" and insert --(63)-- therefor In the Specification Column 15, Detailed Description, Line 43:
Delete "22," and insert --10,-- therefor Signed and Sealed this
Twentieth Day of December, 2022

Katherine Kelly Vidal
*Director of the United States Patent and Trademark Office*